United States Patent
Lietz et al.

(10) Patent No.: US 9,342,690 B2
(45) Date of Patent: May 17, 2016

(54) METHOD AND APPARATUS FOR A SCORING SERVICE FOR SECURITY THREAT MANAGEMENT

(71) Applicant: Intuit Inc., Mountain View, CA (US)

(72) Inventors: M. Shannon Lietz, San Marcos, CA (US); Luis Felipe Cabrera, Bellevue, WA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 14/292,700

(22) Filed: May 30, 2014

(65) Prior Publication Data

US 2015/0347750 A1    Dec. 3, 2015

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/55* | (2013.01) |

(52) U.S. Cl.
CPC .................................... *G06F 21/552* (2013.01)

(58) Field of Classification Search
CPC .................................................. G06F 21/552
USPC .......................................................... 726/23
See application file for complete search history.

(56) References Cited

U.S. PATENT DOCUMENTS

| | | | | |
|---|---|---|---|---|
| 5,732,218 A | * | 3/1998 | Bland ................. | G06F 11/3495 709/224 |
| 7,836,506 B2 | * | 11/2010 | Liu ..................... | G06F 11/2294 713/187 |
| 7,908,658 B1 | | 3/2011 | Oeij | |
| 8,266,284 B2 | | 9/2012 | Iverson | |
| 8,381,289 B1 | | 2/2013 | Pereira et al. | |
| 8,424,091 B1 | | 4/2013 | Su | |
| 8,527,631 B1 | | 9/2013 | Liang | |
| 8,566,932 B1 | | 10/2013 | Hotta et al. | |
| 8,574,085 B1 | * | 11/2013 | Jackson ................ | A63J 11/00 472/136 |
| 8,789,187 B1 | * | 7/2014 | Pennington ......... | G06F 11/3672 726/22 |
| 8,800,029 B2 | | 8/2014 | Horn et al. | |
| 8,869,036 B1 | * | 10/2014 | Deshpande ......... | G06F 11/3419 715/736 |
| 9,015,795 B2 | | 4/2015 | B'Far et al. | |
| 9,027,135 B1 | * | 5/2015 | Aziz ................... | H04L 63/1408 726/23 |
| 2002/0103801 A1 | | 8/2002 | Lyons | |
| 2004/0044912 A1 | | 3/2004 | Connary et al. | |
| 2006/0042483 A1 | | 3/2006 | Work et al. | |
| 2007/0073630 A1 | | 3/2007 | Greene et al. | |
| 2007/0169194 A1 | | 7/2007 | Church et al. | |
| 2008/0005223 A1 | | 1/2008 | Flake et al. | |

(Continued)

OTHER PUBLICATIONS

Rambur et al., "Method and System for Access Control Management Using Reputation Scores," U.S. Appl. No. 14/286,228, filed May 23, 2014.

*Primary Examiner* — Dant Shaifer Harriman
(74) *Attorney, Agent, or Firm* — Hawley Troxell Ennis & Hawley LLP; Philip McKay (57) ABSTRACT

A method and system for providing a security threat scoring service to identify and prioritize potential security threats to an online service. The method and system include determining security threat patterns, comparing traffic to the online system with the security threat patterns, and identifying portions of the traffic as a potential security threat. The method and system include assigning a threat score to the potential security threat, and providing the threat score to the online service to enable the online service to secure against the potential security threat.

22 Claims, 2 Drawing Sheets

(56) References Cited

U.S. PATENT DOCUMENTS

| | | |
|---|---|---|
| 2009/0228294 A1 | 9/2009 | Choi et al. |
| 2009/0300720 A1 | 12/2009 | Guo et al. |
| 2010/0005099 A1 | 1/2010 | Goodman et al. |
| 2010/0114744 A1 | 5/2010 | Gonen |
| 2010/0169192 A1 | 7/2010 | Zoldi et al. |
| 2010/0280958 A1* | 11/2010 | Hasson ............ G06Q 20/40 705/75 |
| 2010/0293094 A1 | 11/2010 | Kolkowitz et al. |
| 2011/0202551 A1 | 8/2011 | Agrawal |
| 2011/0276468 A1 | 11/2011 | Lewis et al. |
| 2011/0296519 A1 | 12/2011 | Ide et al. |
| 2012/0030767 A1 | 2/2012 | Rippert et al. |
| 2012/0084856 A1 | 4/2012 | Hom et al. |
| 2012/0174219 A1 | 7/2012 | Hernandez et al. |
| 2012/0239557 A1 | 9/2012 | Weinflash et al. |
| 2013/0018972 A1 | 1/2013 | Sargent et al. |
| 2013/0124644 A1 | 5/2013 | Hunt et al. |
| 2013/0268994 A1 | 10/2013 | Cooper et al. |
| 2014/0074560 A1 | 3/2014 | B'Far et al. |
| 2014/0081681 A1 | 3/2014 | Sundaresan |
| 2014/0137199 A1 | 5/2014 | Hefetz |
| 2014/0201841 A1* | 7/2014 | Deshpande ........ G06F 21/577 726/25 |
| 2014/0215608 A1 | 7/2014 | Rajagopalan et al. |
| 2014/0223555 A1 | 8/2014 | Sanz Hernando et al. |
| 2014/0310806 A1 | 10/2014 | Horn et al. |
| 2015/0052608 A1 | 2/2015 | Sallam |
| 2015/0180903 A1 | 6/2015 | Cooper et al. |

\* cited by examiner

METHOD AND APPARATUS FOR A SCORING SERVICE FOR SECURITY THREAT MANAGEMENT

BACKGROUND

Developers and online service providers have to consider security threats while developing and providing online services to users. For example, if users' information is compromised through a particular online service, the users' personal information may be used to steal or hijack the users' identity, i.e., identity theft. Although a stolen identity can lead to monetary losses, at least as significant is the fact that the victims of identity theft, i.e., the users, are subject to feeling vulnerable and may associate their vulnerability with the online service provider. As an example, when a large U.S. retailer forfeited over 100 million shoppers' bank/credit card information to hackers in 2013, the retailer was immediately subject to losses of confidence by both its customers and its investors. Hence, inattention to security threats can affect the short-term and long-term success of a company, e.g., an online service provider, in a marketplace.

The quantity of potential security threats in existence can be overwhelming for both service providers and the developers that maintain the operations of the online services. What is needed is a method and system for providing a security threat scoring service to identify and prioritize potential security threats for service providers and developers.

SUMMARY

In accordance with one embodiment, a method and system for providing a threat scoring service for security threat management may include determining, with a computing system, security threat patterns by monitoring first traffic between the online service and a test program. The first traffic may include requests for information transmitted to the online service from the test program. The security threat patterns may be determined by recording patterns associated with the first traffic between the test program and the online service. The patterns associated with the first traffic may include durations of delays between transmission of requests from the test program to the online service. The security threat patterns may be determined by defining deviations from the patterns as the security threat patterns. The method and system may include comparing second traffic between one or more external computing systems and the online service to the security threat patterns. The method and system may include identifying portions of the second traffic as a potential security threat, if the portions of the second traffic correlate with at least one of the security threat patterns. The method and system may include assigning a threat score to the potential security threat based on a potential impact of the potential security threat on the online service. The method and system may include providing the threat score to the online service to enable the online service to secure against the potential security threat.

In one embodiment, determining security threat patterns may include receiving patterns from human analysts. In one embodiment determining security threat patterns may include retrieving security threat patterns from an information management security vendor. In one embodiment, assigning a threat score may include assigning a number of a predetermined range of numbers to the potential security threat, with a higher number being associated with a higher security priority.

In one embodiment, providing the threat score may include delaying transmission of the threat score based on a priority of the potential security threat. In one embodiment, assigning the threat score to the potential security threat includes evaluating a service configuration to determine a vulnerability of the online service. In one embodiment, the service configuration may include hardware characteristics of a host computing system for the online service, and a type of information stored and provided by the online service.

BRIEF DESCRIPTION OF THE DRAWINGS

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE and PROCESS sections herein include systems and processes suitable for incorporating various embodiments of methods and systems for automating threat model generation for an application, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party. Examples of trusted computing environments include the assets and components making up data centers associated with, and/or controlled by, an application and/or any computing systems and/or virtual assets, and/or networks of computing systems and/or virtual assets, associated with, known by, and/or controlled by, an application.

In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party. Examples of untrusted computing environments include, but are not limited to, public networks, such as the Internet, various cloud-based computing environments, and various other forms of distributed computing systems.

In various embodiments, each computing environment includes allocated assets and virtual assets associated with, and controlled or used to create, and/or deploy, and/or operate an application.

It is often the case that to create, and/or deploy, and/or operate, application data must be transferred between a first computing environment that is an untrusted computing environment and a trusted computing environment. However, in other situations a party may wish to transfer data between two trusted computing environments, and/or two untrusted computing environments.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as virtual assets.

Typically, virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. Illustrative examples of such a virtual asset creation template are any of the cloud formation templates/tools provided by Amazon Web Service (AWS), Rack Space, Joyent, and/or any other of the numerous cloud based infrastructure providers.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system or any other fundamental element, or set of elements, used to override the default settings on a node within an infrastructure or architecture.

Other examples of virtual asset creation templates include, but are not limited to, any virtual appliance used to instantiate virtual assets. One specific illustrative, example of such a virtual asset creation template is an Amazon Machine Image (AMI), and/or similar functionality provided by Amazon Web Service (AWS), Rack Space, Joyent, and/or any other of the numerous cloud based infrastructure providers.

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

Herein virtual assets that have the same, or similar, operational parameters and are created by the same or similar virtual asset creation template are generically referred to as virtual assets of the same "class." Examples of virtual asset classes include, but are not limited to, virtual machine classes; virtual server classes; virtual database or data store classes; self-monitoring virtual assets including specific types of instances instantiated in a cloud environment; application development process classes; and application classes.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "tenant" includes, but is not limited to, any user that enters a relationship, agreement, and/or contract, with an asset service provider or other service provider to receive an allocation of one or more assets or asset resources within an asset computing environment. In some embodiments, the terms "tenant" and "tenant computing environment" are interchangeably used even though, in some cases, a tenant represents a party, parties, or entities while the tenant computing environment represents one or more computing resources that are used by or that are at least partially under the control of the tenant.

Hardware Architecture

Figure 1:
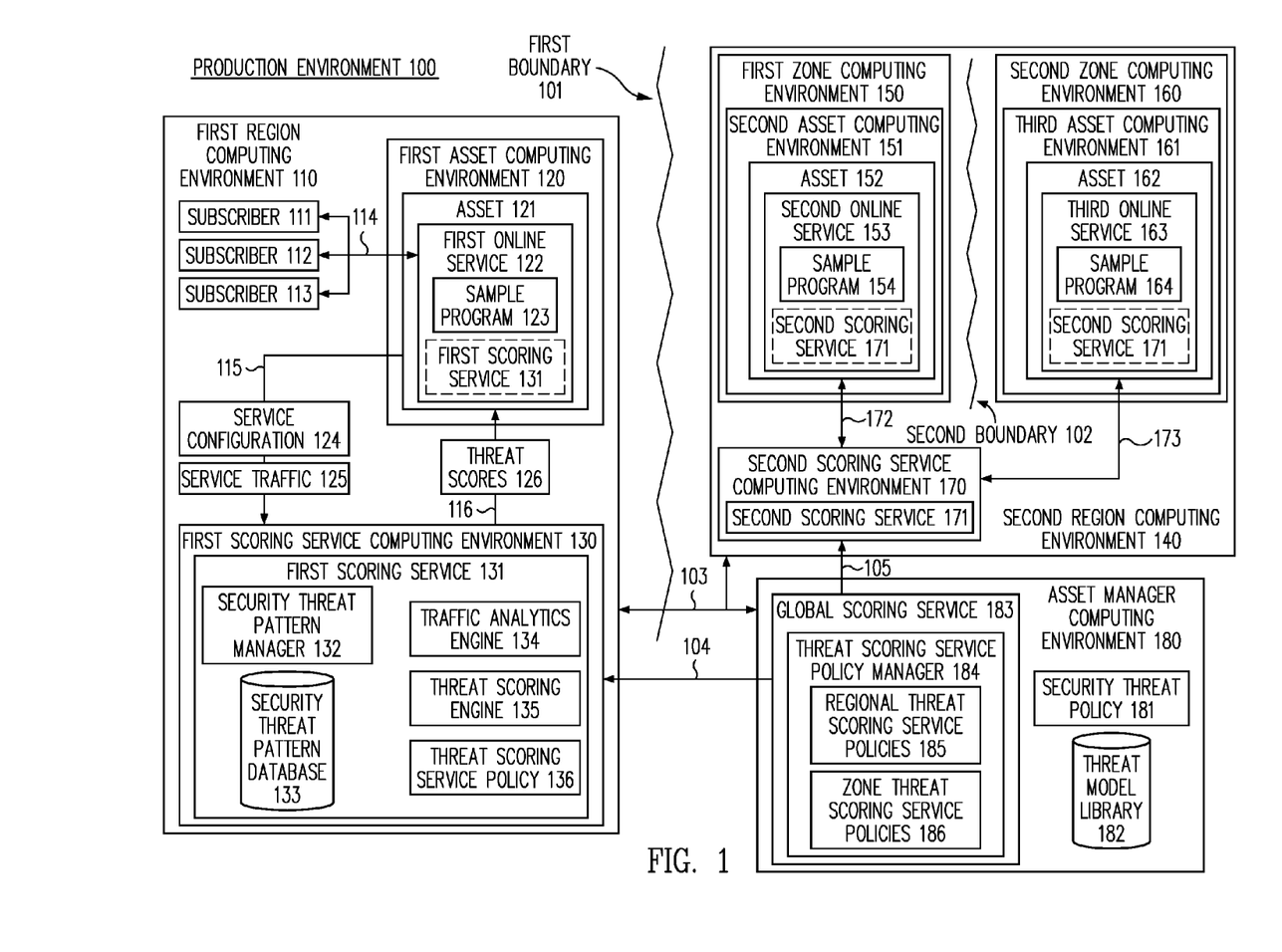
FIG. 1 is a block diagram of a hardware architecture providing a security threat scoring service, in accordance with one embodiment.

FIG. 1 illustrates a block diagram of a production environment 100 for assigning threat scores to potential security threats to online services, according to one embodiment. While many computing security threats have been discovered, new security threats continue to emerge, resulting in continued security updates for the online services. While some security threats compromise personal information of customers of online services, other security threats merely result in a negligible impact to the online service, e.g., the security threat marginally decreases connection speeds to/from the online service. Thus, some security threats should be addressed with a higher priority than other security threats.

The production environment 100 includes various computing environments that assist developers or online service providers in identifying and prioritizing potential security threats, according to one embodiment. The production environment 100 provides systems and methods for assigning threat scores to potential security threats by determining patterns associated with potential security threats, monitoring traffic to and/or from an online service, identifying a potential security threat by correlating online service traffic with one or more potential security threat patterns, assigning a threat score to the identified potential security threat, and delivering the threat score to the online service or online service provider for consideration and/or remedial action. The production environment 100 includes a first region computing environment 110 having a first asset computing environment 120 and a first scoring service computing environment 130, according to one embodiment. The production environment 100 further includes a second region computing environment 140 that is geographically separated from the first region computing environment 110 by a first boundary 101, e.g., a geographical boundary, according to one embodiment. The second region computing environment 140 includes a first zone computing environment 150, a second zone computing environment 160, and a second scoring service computing environment 170, according to one embodiment. The production environment 100 also includes an asset manager computing environment 180 that is communicatively coupled with the first region computing environment 110 and the second region computing environment 140 through a network connection 103, according to one embodiment.

The first region computing environment 110 provides threat scoring services to one or more online services hosted by assets located in a particular geographic region, according to one embodiment. The particular geographic region associated with the first region computing environment is different than a geographic region corresponding with the second region computing environment 140, according to one embodiment. Within the first region computing environment 110, the first asset computing environment 120 receives threat scoring services from the first scoring service computing environment 130 to identify one or more security threats delivered by one or more subscribers 111, 112, and 113. The subscribers 111, 112, and/or 113 subscribe to or use an online service provided by the first asset computing environment 120, according to one embodiment. In another embodiment, the subscribers 111, 112, and/or 113 represent any computing system or computing device that can establish an authorized or unauthorized connection with the first online service 122 through a network 114, according to one embodiment.

The first asset computing environment 120 includes at least one asset 121 to host a first online service 122. The asset 121 provides a variety of hardware, software, and/or firmware services to a tenant to enable the tenant to host the first online service 122. According to one embodiment, a tenant of the asset 121 is the service provider that developed, and/or injected the first online service 122 into the asset 121. According to one embodiment, the asset 121 is an allocation of one or more instances, server instances, or virtual server instances of hardware within the first asset computing environment 120 that are allocated to a particular tenant for hosting one or more applications, such as the first online service 122.

The first online service 122 includes computer-executable or computer-readable instructions that cause the asset 121, or computer processors of the asset 121, to provide one or more services to users, such as the subscribers 111, 112, and/or 113, according to one embodiment. The first online service 122 can provide any one of a number of online services. In one embodiment, the first online service 122 is configured to provide a service that includes, but is not limited to, any one or more of: credit-risk simulations for a lending company, video streaming, media account management, online software distribution and deployment, live video feeds, personal video sharing, social media, travel reservations, database hosting, advertisements, educational resources, streaming audio, or the like. Because the first online service 122 provides a service to multiple users/subscribers, the first online service 122 may include personal information of users, such as credit card information, usernames, passwords, home addresses, telephone numbers, bank account numbers, social security numbers, or the like. Because the first online service 122 interfaces with the subscribers 111, 112, and/or 113 over the network 114, the first online service 122 is susceptible to attempts of malicious attack and manipulation by one or more subscribers 111, 112, and 113. To receive information regarding security threats and their potential impact on the first online service 122, the first asset computing environment 120 transmits a service configuration 124 and service traffic 125 to the first scoring service computing environment 130, according to one embodiment.

The first scoring service computing environment 130 receives the service configuration 124 and the service traffic 125 over a communication channel 115 from the first online service 122 and, in response, selectively returns/provides threat scores 126 to the first online service 122 that correspond with the received service traffic 125, according to one embodiment. The service configuration 124 represents the hardware, software, and/or firmware characteristics of the asset 121, in addition to the APIs, API parameters, and other interface commands that are available for external computing systems to communicate with the first online service 122, according to one embodiment. The service traffic 125 is that traffic between the first online service 122 and the subscribers 111, 112, and 113 on the network 114, according to one embodiment. The first scoring service computing environment 130 includes a first scoring service 131, a security threat pattern manager 132, a security threat pattern database 133, a traffic analytics engine 134, a threat scoring engine 135, and a threat scoring service policy 136, that, in one embodiment, enable the first scoring service computing environment 130 to analyze the service traffic 125 and provide a threat scoring 126 to the first online service 122, according to one embodiment. The first scoring service computing environment 130 determines normal and unusual traffic patterns, analyzes the traffic based on the traffic patterns, assigns threat scores to any identified patterns in the traffic, and transmits the threat scores to the first online service 122 for consideration, according to one embodiment.

The security threat pattern manager 132 determines and maintains security threat patterns for potential security threats for use by the first scoring service 131, according to one embodiment. A security threat pattern can be found in the procedural characteristics of the service traffic 125 and/or can be found in the content of the service traffic 125, according to one embodiment. Procedural characteristics of the service traffic 125 include, but are not limited to, frequency, time of day, and/or the lapses between transmissions of commands, data, and requests associated with application programming interfaces ("APIs") or other interfaces between the first online service 122 and external computing systems, according to one embodiment. Table 1 is provided below with an example security threat pattern that is based on service traffic between the first online service 122 and a subscriber to the online service, e.g., subscriber 111.

TABLE 1

| Online Service API | Normal Traffic Pattern | Suspicious Traffic Pattern |
|---|---|---|
| API A | FAST | FAST |
| API B | SLOW | FAST |
| API A | FAST | FAST |
| API C | FAST | SLOW |
| API D | SLOW | FAST |
| API E | SLOW | SLOW |

As seen above, Table 1 includes an online service API column, a normal traffic pattern column, and a suspicious traffic pattern column. The online service API column illustrates an order in which example APIs are called or executed during a routine request for online services, e.g., to stream an online video. In Table 1, the order by which the example APIs should be called is: "API A", "API B", "API A", "API C", "API D", and "API E", as an example. Some APIs can return significantly more information and parameters than other APIs, so some APIs may require a longer duration of processing prior to execution of a subsequent API. For example, API A may return smaller quantities of information and/or small sized files in response to execution. In contrast, API B, API D, and API E, may return large files and/or large numbers of parameters that need processing prior to execution of a subsequent API. For APIs that return large amounts of information, the security threat pattern manager 132 or a security analyst can enter minimum execution times that a well-equipped computing system would be unable to out-perform. The security threat pattern manager 132 can then flag any processing times that are faster than the minimum time limitations as suspicious. Therefore, a normal traffic pattern for the online service APIs of Table 1 is "FAST", "SLOW", "FAST", "FAST", "SLOW", and "SLOW", according to one embodiment. A suspicious traffic pattern for the order of the online service APIs of Table 1 is "FAST", "FAST", "FAST", "SLOW", "FAST", and "SLOW", according to one embodiment. The suspicious traffic pattern is suspicious when compared to the normal traffic pattern at least because API B and API D are executed more rapidly than should be possible with premium computing resources, according to one embodiment. In another embodiment, the suspicious traffic pattern is suspicious when compared to a normal traffic pattern because of an ordering of API executions that does not make sense. For example, if an API is dependent on one or more other APIs but is executed prior to the APIs upon which it is dependent, the security threat pattern manager 132 may identify such API executions as suspicious. Suspicious traffic patterns between the first online service 122 and external computing systems/environments are flagged or identified as security threat patterns, according to one embodiment.

The service traffic 125 between the first online service 122 and external computing systems/environments can also be flagged or identified as a security threat pattern based on the content of the traffic. For example, particular sequences of bits, bytes, words, or the like can be unique to particular viruses, hacking schemes, or other malicious operations. In one embodiment, the content-based security threat patterns and the procedural characteristic security threat patterns are stored in the security threat pattern database 133 by the security threat pattern manager 132 to support analysis of the service traffic 125, according to one embodiment.

The security threat pattern manager 132 can determine threat patterns for potential security threats using any one of a number of techniques. In one embodiment, the security threat pattern manager 132 requests and receives security threat patterns from an information management security service provider or vendor. The security threat pattern manager 132 then updates the security threat pattern database 133 with the received security threat patterns. In another embodiment, computing security analysts manually update the security threat pattern database through the security threat pattern manager 132 after compiling, reverse-engineering, or otherwise analyzing traffic patterns between a malicious computing device and a service provider. For example, computing security analysts can simulate and monitor traffic patterns between a test computing system and a test asset hosting a test online service by configuring the test computing system to send or execute security threats on the test online service. Based on the traffic patterns monitored from the simulation, the analysts can determine and record particular patterns that are associated with particular types of security threats. In some embodiments, the types of threats for which security threat patterns are stored in the security threat pattern database 133 include, but are not limited to, spoofing, tampering, repudiation, information disclosure, denial of service, and/or elevation of privilege, among others.

The security threat pattern manager 132 can determine threat patterns or potential security threats by establishing baseline time limits for the reasonable execution of one or more APIs associated with the first online service 122. For example, the security threat pattern manager 132 can cause the first online service 122 to execute a sample program 123 that cycles through one or more APIs of the first online service 122. During the execution of the sample program 123, the security threat pattern manager 132 can monitor the execution of the APIs and establish minimum time delays that are likely to occur or that should occur during normal and/or non-malicious communications with the first online service 122, according to one embodiment. As shown above in Table 1, the security threat pattern manager 132 can then record, create, or determine baseline or normal traffic patterns for the service traffic 125 and can determine or define deviations from the baseline as security threat patterns, according to one embodiment. In some embodiments, the security threat pattern manager 132 defines login failure patterns based on APIs associated with login attempts, so that excessive attempts and excessively short delays between successive attempts to login can be flagged as security threat patterns. In some embodiments, the patterns include, but are not limited to, time references, such as "FAST", "SLOW", "LONG", "SHORT", "QUICK", "MEDIUM", "VERY SLOW", "VERY FAST", or the like. In other embodiments, the patterns include, but are not limited to, bandwidth references and/or payload size references, such as, "SMALL", "MEDIUM", "LARGE", "VERY LARGE", or the like.

The security threat pattern manager 132 can also determine defined anti-patterns, in one embodiment. By evaluating normal execution patterns of APIs for the first online service 122 for extended periods of time, the security threat pattern manager 132 can develop a sizable library in the security threat pattern database 133 of reasonable, allowable, and/or "normal" API execution sequences. The security threat pattern manager 132 can then define any traffic patterns that do not fit within the predetermined model as a subset of security threat patterns, i.e., anti-patterns. When an anti-pattern occurs, the first scoring service 131 can flag or identify the service traffic 125 associated with the anti-pattern as being potentially malicious, according to one embodiment.

The traffic analytics engine 134 identifies potential security threats by correlating the service traffic 125 with one or more security threat patterns received from the security threat pattern manager 132, according to one embodiment. The traffic analytics engine 134 can be configured to compare some or all of the service traffic 125 against the security threat patterns of the security threat pattern database 133, in one embodiment. In another embodiment, the traffic analytics engine 134 monitors periodic or random samples of the service traffic 125 and compares the periodical random samples of the service traffic 125 to the security threat patterns. In another embodiment, the traffic analytics engine 134 monitors the service traffic 125 of new subscribers until the traffic analytics engine 134 verifies/determines that the new subscriber is using the first online service 122 appropriately. If the traffic analytics engine 134 finds a correlation between a security threat pattern and the service traffic 125, the traffic analytics engine 134 can identify the relevant portion of the service traffic 125 as a potential security threat.

The threat scoring engine 135 assigns a threat score to potential security threats identified by the traffic analytics engine 134, according to one embodiment. The threat scoring engine 135 can be configured to determine the relative impact of a potential security threat to the asset 121, to other users of the first online service 122, and/or to the first online service 122. For example, the threat scoring engine 135 can assign, based on the impact of the potential security threat, a numerical score to the potential security threat. For example, the threat scoring engine 135 can assign a 10 to potential security threats having the highest probability of successful attack and that acquire personal data of subscribers to the first online service 122. The threat scoring engine 135 can assign a 0 to potential security threats having the lowest probability of successful attack and/or that are likely to have a negligible effect on the performance of the first online service 122, according to one embodiment. The threat scoring engine 135 can use various factors, such as asset configuration, number of subscribers, security features developed into the first online service 122, notification of new security threats or external risks, or input from a third party vulnerability scanner, to provide context while assessing a potential security threat and assigning a threat score. In some embodiments, the threat scores range between 0-10. In other embodiments, the threat scores range between 0-100. In yet other embodiments, the threat scores include values, such as, "LOW", "MEDIUM", and "HIGH". In one embodiment, the threat scores can include color coordinating so that high priority potential security threats are red, low priority potential security threats are orange, and the absence of potential security threats is indicated with green. As those of skill in the art will appreciate, other scoring ranges or values can be used while assigning a threat score to a potential security threat, according to various embodiments.

The threat scoring service policy 136 determines frequencies by which security threat patterns are updated and by which the threat scores 126 are selectively delivered to the first online service 122, according to one embodiment. The threat scoring service policy 136 determines the frequency by which security threat patterns are updated, to manage computing resources of the first scoring service computing environment 130. In some embodiments, it may be unreasonable for the security threat pattern manager 132 to be constantly analyzing service traffic 125 for new patterns. In some embodiments, the threat scoring service policy 136 may enable the security threat pattern manager 132 to update security threat patterns daily, every other day, weekly, semi-monthly, monthly, quarterly, or the like. In some embodiments, it may be frustrating to developers to receive the threat scores 126 for the service traffic 125 too frequently, so the threat scoring service policy 136 may define or determine that threat scores are transmitted to the first online service 122 on a periodic basis in digests, rather than in real time. In some embodiments, the threat scoring service policy 136 determines that all potential security threats having the threat scores 126 between 0-5 are periodically transmitted to the first online service 122, e.g., on a weekly, semi-monthly, or monthly basis. In one embodiment, the threat scoring service policy 136 determines that potential security threats having threat scores 126 of 8-10 are immediately transmitted to the first online service 122. In one embodiment, the developer of the first online service 122 adjusts the threat scoring service policy 136 according to the computing resources and human resources available to update the first online service 122.

The first scoring service 131 delivers the threat scores 126 to the first online service 122 for consideration and/or remedial action, according to one embodiment. In some embodiments, the first scoring service 131 can provide one or more identifiers, e.g., an IP address, to the first online service 122 of the subscriber involved in the potential security threat to allow the first online service 122 to block future communications from the suspected subscriber. In one embodiment, the first scoring service 131 provides one or more identifiers to the first online service 122 to allow the first online service 122 to notify disciplinary authorities of any malicious activities engaged in by the suspected subscriber. In one embodiment, the information from the first scoring service 131 enables the first online service 122 to transmit one or more notifications to the suspected subscriber to verify that the subscriber's account has not been hacked into, spoofed, or otherwise compromised.

The second region computing environment 140 is associated with a geographical region that is separated from a geographical region of the first region computing environment 110, by the first boundary 101. Geographically separating assets and computing environments can advantageously allow an asset service provider to provide computing resources that are local to tenants, such as a developer or provider of online services, according to one embodiment. The second region computing environment 140 includes a first zone computing environment 150 and a second zone computing environment 160. The first zone computing environment 150 and the second zone computing environment 160 are both geographically located within the region associated with the second region computing environment 140, according to one embodiment. The first zone computing environment 150 is, however, physically separated from the second zone computing environment 160 by a second boundary 102, according to one embodiment. The second boundary 102 is a geographic boundary that can be arbitrarily established based on data center locations, or other operational interests of an asset service provider, according to one embodiment. In one embodiment, the first zone computing environment 150 is located in a distinct location that is engineered to be insulated from failures of the second zone computing environment 160 and is configured to provide network connectivity to the second zone computing environment 160. In one embodiment, the geographic region of the first zone computing environment 150 and the second zone computing environment 160 is the designation of one or more specific zone computing environments that are engineered to be insulated from failures of other zone computing environments.

The first zone computing environment 150 and the second zone computing environment 160 include, respectively, a second asset computing environment 151, and a third asset computing environment 161, according to one embodiment. The second asset computing environment 151 and the third asset computing environment 161 may include similar features and may operate in a similar manner as the first asset computing environment 120, according to one embodiment. The second asset computing environment 151 includes an asset 152, a second online service 153, and a sample program 154, for delivering online services to subscribers or other users and for supporting the function of the second scoring service 171, according to one embodiment. The third asset computing environment 161 includes an asset 162, a third online service 163, and a sample program 164, for delivering online services to subscribers or other users and for supporting the function of the second scoring service 171, according to one embodiment.

The second scoring service computing environment 170 provides threat scores for potential security threats against the online services within the second region computing environment 140, according to one embodiment. The second scoring service computing environment 170 is communicatively coupled to the second online service 153 with a communication channel 172 and to the third online service 163 with a communication channel 173, according to one embodiment. The second scoring service computing environment 170 includes a second scoring service 171. The second scoring service 171 includes the various managers, engines, databases, policies, and functions of the first scoring service 131, with the exception that the second scoring service 171 is applied to the second region computing environment 140 other than the first region computing environment 110, according to one embodiment.

The asset manager computing environment 180 manages the assets of the production environment 100, in addition to providing security support for applications and online services hosted by the assets 121, 152, and 162, according to one embodiment. The asset manager computing environment 180 includes a security threat policy 181, a threat model library 182, and a global scoring service 183. The security threat policy 181 defines/determines minimum standards or requirements that online services are required to satisfy prior to receiving authorization to be hosted on one or more of the assets 121, 152, and 162. For example, the security threat policy 181 may determine that an online service include built-in features for protecting/securing against various types of security threats, e.g., spoofing, tampering, denial of service, etc., according to one embodiment The asset manager computing environment 180 updates and maintains the threat model library 182, which includes types of security threats that may affect computing environments or assets within the production environment 100, according to one embodiment. The asset manager computing environment 180 is configured to distribute the contents of the threat model library 182 to the first scoring service 131 and the second scoring service 171, to enable the scoring services 131, 171 to incorporate up-to-date information regarding potential security threats, according to one embodiment.

The asset manager computing environment 180 uses the global scoring service 183 to synchronize threat scoring service policies throughout the production environment 100, according to one embodiment. The global scoring service 183 includes a threat scoring service policy manager 184, which includes regional threat scoring service policies 185 and the zone threat scoring service policies 186. The global scoring service 183 can function as a master scoring service that synchronizes the first scoring service 131 and the second scoring service 171, in one embodiment. In another embodiment, the global scoring service 183 performs the functions of the first scoring service 131 and the second scoring service 171, as a centralized scoring service provider. For example, the global scoring service 183 can include all of the functionality of the first scoring service 131 and the second scoring service 171 and can directly manage providing the threat scores 126 to the first online service 122, the second online service 153, and the third online service 163 through the network connection 103, according to one embodiment.

The threat scoring service policy manager 184 can ensure that regional threat scoring service policies 185 and the zone threat scoring service policies 186 are properly distributed and executed throughout the production environment 100. In one embodiment, the threat scoring service policy manager 184 executes a different set of rules for the first region computing environment 110 than for the second region computing environment 140, for example, based on the laws of the lands in which the first region computing environment 110 operates. The threat scoring service policy manager 184 can also maintain and distribute different rules for different zones, e.g., the first zone computing environment 150 and the second zone computing environment 160, in accordance with the zone threat scoring service policies 186. The threat scoring service policy manager 184 can use communication channels 104 and 105 to communicate with the first and second scoring services 131, 171, according to one embodiment.

Although the scoring services are illustrated as distributed on a regional level, in one embodiment, the scoring services are distributed on a zone level or an asset level. For example, the first scoring service 131 can be built-in the first online service 122 when the first online service 122 is instantiated or created in the asset 121. Similarly, the second scoring service 171 can be built-in the second online service 153 and/or the third online service 163 during or after instantiation of the online services, according to various embodiments.

Process

Figure 2:
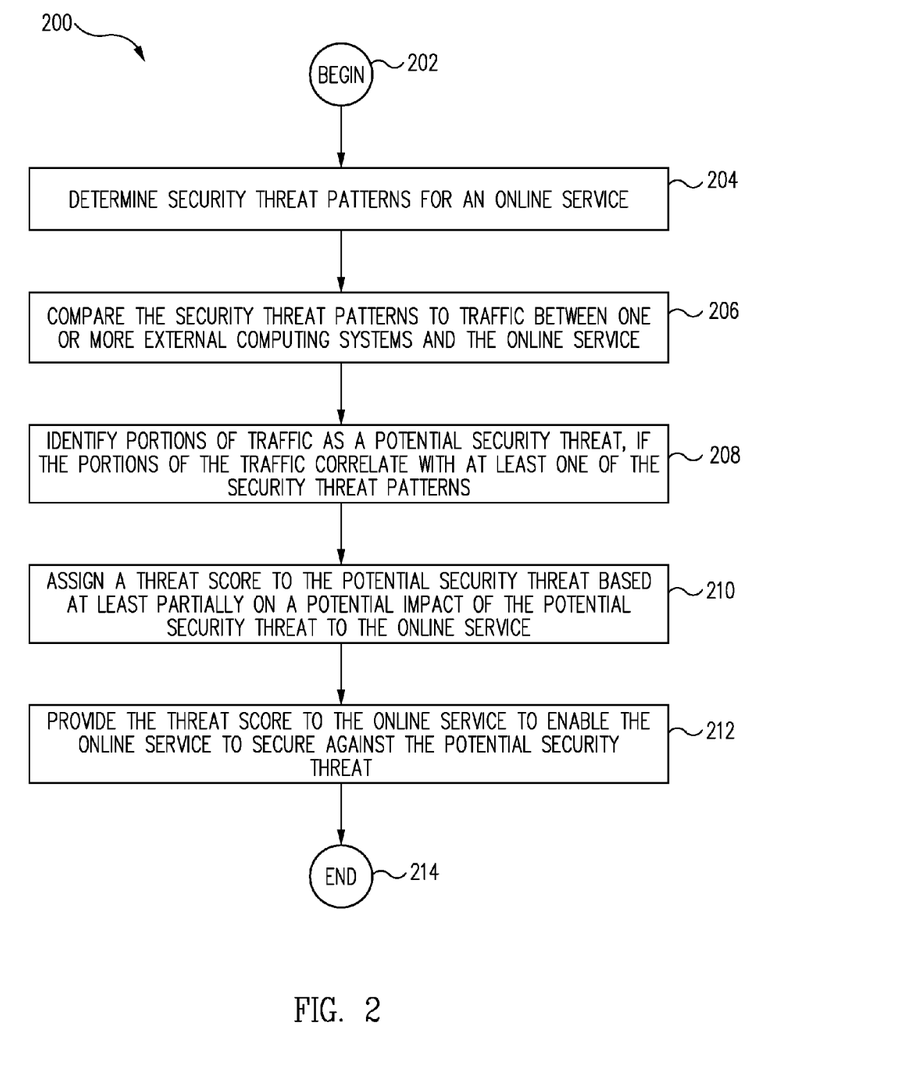
FIG. 2 is a flow diagram for providing a security threat scoring service, in accordance with one embodiment.

FIG. 2 illustrates a flow diagram of a process 200 for providing a security threat scoring service to identify and prioritize potential security threats for an online service, according to various embodiments.

At block 202, the process 200 begins.

At block 204, the process 200 determines security threat patterns for an online service, according to one embodiment.

The security threat patterns can be determined by monitoring non-malicious traffic and recording normal patterns associated with the traffic, and then defining deviations from the normal patterns as security threat patterns. In one embodiment, the security threat patterns are determined by retrieving the security threat patterns from an information management security vendor.

At block 206, the process 200 compares the security threat patterns to traffic between one or more external computing systems and the online service.

At block 208, the process 200 identifies portions of the traffic as a potential security threat, if the portions of the traffic correlate with at least one of the security threat patterns.

At block 210, the process 200 assigns a threat score to the potential security threats at least partially based on a potential impact of the potential security threat to the online service. For example, if the potential security threat can compromise financial data, e.g., credit card information of customers, the threat score will be higher than if the potential security threats causes minor decreases in network connectivity speeds, according to one embodiment. To determine the potential impact of the potential security threat, the process evaluates the context of the potential security threat. In other words, the process evaluates the characteristics of the asset that is hosting the online service, the type of threat, the likelihood of success of the threat, and the like.

At block 212, the process 200 provides the threat score to the online service to enable the online service to secure against the potential security threat. In one embodiment, the online service secures against the potential security threat by submitting the security threat to disciplinary authorities to track down and punish the author(s) of the security threat. In other embodiments, the online service secures against the potential security threat by blocking access of one or more computing systems to the resources of the online service.

At block 214, the process 200 ends.

As noted above, the specific illustrative examples discussed above are but illustrative examples of implementations of embodiments of the method or process for providing a security threat scoring service to identify and prioritize potential security threats for service providers and developers of an online service. Those of skill in the art will readily recognize that other implementations and embodiments are possible. Therefore the discussion above should not be construed as a limitation on the claims provided below.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing a security threat scoring service to identify and prioritize potential security threats for an online service, comprising:
   determining, with a computing system, security threat patterns by:
       monitoring first traffic between the online service and a test program,
           wherein the first traffic includes requests for information transmitted to the online service from the test program, wherein the requests include data representing requests to application programming interfaces of the online service for communicating with the online service;
       recording patterns associated with the first traffic between the test program and the online service, wherein the patterns associated with the first traffic include durations of delays between transmission of requests from the test program to the online service; and defining deviations from the patterns as the security threat patterns, wherein the deviations include a delay threshold that is shorter in duration than the durations of delays between transmission of requests from the test program to the online service, wherein durations of delays between transmission requests from one or more external computing systems to the online service that are faster than the delay threshold are identified as potential security threats;

comparing second traffic between the one or more external computing systems and the online service to the security threat patterns;

identifying portions of the second traffic as a potential security threat, if the portions of the second traffic correlate with at least one of the security threat patterns;

assigning a threat score to the potential security threat at least partially based on a potential impact of the potential security threat on the online service; and providing the threat score to the online service to enable the online service to secure against the potential security threat.

2. The method of claim 1, wherein determining security threat patterns includes receiving patterns from human analysts.

3. The method of claim 1, wherein determining security threat patterns includes retrieving security threat patterns from an information management security vendor.

4. The method of claim 1, wherein assigning a threat score includes assigning a number of a predetermined range of numbers to the potential security threat, wherein a higher number is associated with a higher security priority.

5. The method of claim 1, wherein providing the threat score includes delaying transmission of the threat score based on a priority of the potential security threat.

6. The method of claim 1, wherein assigning the threat score to the potential security threat includes evaluating a service configuration to determine a vulnerability of the online service.

7. The method of claim 6, wherein the service configuration includes hardware characteristics of a host computing system for the online service, and a type of information stored and provided by the online service.

8. A computing system implemented method for providing a security threat scoring service to identify and prioritize potential security threats for an online service, comprising:

maintaining, with a computing system, a database of security threat patterns, wherein the security threat patterns include a delay threshold that has a shorter durations of delays than predetermined durations of delays between transmissions of requests to the online service from a client computing device, wherein the requests to the online service include data representing interactions with application programming interfaces for the online service, wherein the security threat patterns include deviations from predetermined communications characteristics that are selected from a group of communications characteristics consisting of:

a frequency of communication with the online service;

a time of day of communication with the online service; and an order of requests for information during communication with the online service;

comparing traffic between one or more external computing systems and the online service to the security threat patterns;

identifying portions of the traffic as a potential security threat, if the portions of the traffic match with at least one of the security threat patterns;

assigning a threat score to the potential security threat at least partially based on an estimated function of the potential security threat in the online service; and providing the threat score to the online service to enable the online service to secure against the potential security threat.

9. The method of claim 8, wherein the estimated function includes one or more of spoofing, tampering, elevation of privilege, and denial of service.

10. The method of claim 8, further comprising:

transmitting identification of the one or more computing systems from which the potential security threat originates, to the online service, wherein the online service secures against the potential security threat by blocking service to one of the one or more computing system based on the identification.

11. The method of claim 8, further comprising:

transmitting an IP address of the one or more computing systems from which the potential security threat originates, to the online service, wherein the online service secures against the potential security threat by submitting a report to a disciplinary authority, wherein the report includes the IP address.

12. A system for providing a security threat scoring service to identify and prioritize potential security threats for an online service, the system comprising:

at least one processor; and at least one memory coupled to the at least one processor, the at least one memory having stored therein instructions which when executed by any set of the one or more processors, perform a process for providing a security threat scoring service to identify and prioritize potential security threats, the process including:

determining, with a computing system, security threat patterns by:

monitoring first traffic between the online service and a test program, wherein the first traffic includes requests for information transmitted to the online service from the test program, wherein the requests include data representing requests to application programming interfaces of the online service for communicating with the online service;

recording patterns associated with the first traffic between the test program and the online service, wherein the patterns associated with the first traffic include durations of delays between transmission of requests from the test program to the online service; and defining deviations from the patterns as the security threat patterns wherein the deviations include a delay threshold that is shorter in duration than the durations of delays between transmission of requests from the test program to the online service, wherein durations of delays between transmission requests from one or more external computing systems to the online service that are faster than the delay threshold are identified as potential security threats;

comparing second traffic between the one or more external computing systems and the online service to the security threat patterns;

identifying portions of the second traffic as a potential security threat, if the portions of the second traffic correlate with at least one of the security threat patterns;

assigning a threat score to the potential security threat at least partially based on a potential impact of the potential security threat on the online service; and providing the threat score to the online service to enable the online service to secure against the potential security threat.

13. The system of claim 12, wherein determining security threat patterns includes receiving patterns from human analysts.

14. The system of claim 12, wherein determining security threat patterns includes retrieving security threat patterns from an information management security vendor.

15. The system of claim 12, wherein assigning a threat score includes assigning a number of a predetermined range of numbers to the potential security threat, wherein a higher number is associated with a higher security priority.

16. The system of claim 12, wherein providing the threat score includes delaying transmission of the threat score based on a priority of the potential security threat.

17. The system of claim 12, wherein assigning the threat score to the potential security threat includes evaluating a service configuration to determine a vulnerability of the online service.

18. The system of claim 17, wherein the service configuration includes hardware characteristics of a host computing system for the online service, and a type of information stored and provided by the online service.

19. A system for providing a security threat scoring service to identify and prioritize potential security threats for an online service, comprising:
   at least one processor; and
   at least one memory coupled to the at least one processor, the at least one memory having stored therein instructions which when executed by any set of the one or more processors, perform a process for providing a security threat scoring service to identify and prioritize potential security threats, the process including:
   maintaining, with a computing system, a database of security threat patterns,
   wherein the security threat patterns include a delay threshold that has a shorter durations of delays than predetermined durations of delays between transmissions of requests to the online service from a client computing device, wherein the requests to the online service include data representing interactions with application programming interfaces for the online service, wherein the security threat patterns include deviations from predetermined communications characteristics that are selected from a group of communications characteristics consisting of:

a frequency of communication with the online service;
   a time of day of communication with the online service; and
   an order of requests for information during communication with the online service;

comparing traffic between one or more external computing systems and the online service to the security threat patterns;

identifying portions of the traffic as a potential security threat, if the portions of the traffic match with at least one of the security threat patterns;

assigning a threat score to the potential security threat at least partially based on an estimated function of the potential security threat in the online service; and providing the threat score to the online service to enable the online service to secure against the potential security threat.

20. The system of claim 19, wherein the estimated function includes one or more of spoofing, tampering, elevation of privilege, and denial of service.

21. The system of claim 19, wherein the process further includes:
   transmitting identification of the one or more computing systems from which the potential security threat originates, to the online service,
      wherein the online service secures against the potential security threat by blocking service to one of the one or more computing system based on the identification.

22. The system of claim 19, wherein the process further includes:
   transmitting an IP address of the one or more computing systems from which the potential security threat originates, to the online service,
      wherein the online service secures against the potential security threat by submitting a report to a disciplinary authority,
      wherein the report includes the IP address.

* * * * *